United States Patent
Hasberg et al.

(10) Patent No.: US 11,686,593 B2
(45) Date of Patent: Jun. 27, 2023

(54) METHOD FOR OPERATING A MORE HIGHLY AUTOMATED VEHICLE (HAF), IN PARTICULAR A HIGHLY AUTOMATED VEHICLE

(71) Applicant: Robert Bosch GmbH, Stuttgart (DE)

(72) Inventors: Carsten Hasberg, Ilsfeld-Auenstein (DE); Jan-Hendrik Pauls, Grossbottwar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 488 days.

(21) Appl. No.: 16/628,900

(22) PCT Filed: Jun. 4, 2018

(86) PCT No.: PCT/EP2018/064632
§ 371 (c)(1),
(2) Date: Jan. 6, 2020

(87) PCT Pub. No.: WO2019/007604
PCT Pub. Date: Jan. 10, 2019

(65) Prior Publication Data
US 2020/0232808 A1    Jul. 23, 2020

(30) Foreign Application Priority Data

Jul. 7, 2017    (DE) .................. 102017211626.9

(51) Int. Cl.
*G01C 21/36*    (2006.01)
*H04W 4/48*    (2018.01)
(Continued)

(52) U.S. Cl.
CPC ....... *G01C 21/3638* (2013.01); *G01C 21/367* (2013.01); *G06V 20/58* (2022.01); *H04W 4/029* (2018.02); *H04W 4/48* (2018.02)

(58) Field of Classification Search
CPC ........ G01C 21/00; G01C 21/26; G01C 21/28; G01C 21/30; G01C 21/34; G01C 21/36;
(Continued)

(56) References Cited

U.S. PATENT DOCUMENTS

| 2009/0228204 A1* | 9/2009 | Zavoli ..................... G01S 19/49 701/532 |
| 2010/0328462 A1 | 12/2010 | Chen |
| 2015/0233720 A1 | 8/2015 | Harada |

FOREIGN PATENT DOCUMENTS

WO    2009098154 A1    8/2009

OTHER PUBLICATIONS

International Search Report for PCT/EP2018/064632, dated Sep. 14, 2018.

* cited by examiner

*Primary Examiner* — Charles J Han
(74) *Attorney, Agent, or Firm* — Norton Rose Fulbright US LLP; Gerard Messina

(57) ABSTRACT

A method for operating a more highly automated vehicle (HAF), in particular a highly automated vehicle, including: S1—providing a digital map or a highly accurate digital map, in a driver-assistance-system of the HAF; S2—determining a current vehicle position and locating the vehicle position in the digital map; S3—providing at least one expected feature property of at least one feature in a surroundings of the HAF; S4—detecting at least one actual feature property of a feature in the surroundings of the HAF at least partially on the basis of the expected feature property; S5—comparing the actual feature property with the expected feature property and ascertaining at least one differential value; S6—checking the plausibility of the
(Continued)

actual feature property at least partially on the basis of the differential value. Also described is a corresponding system and a computer program.

8 Claims, 2 Drawing Sheets

(51) Int. Cl.
*H04W 4/029* (2018.01)
*G06V 20/58* (2022.01)

(58) Field of Classification Search
CPC ............ G01C 21/3626; G01C 21/3635; G01C 21/3638; G01C 21/3667; G01C 21/367; G05D 1/00; G05D 1/02; G05D 1/021; G05D 1/0268; G05D 1/0274; G05D 1/0276; G05D 1/0278; G05D 2201/00; G05D 2201/02; G05D 2201/0213; G06K 9/00; G06K 9/00624; G06K 9/00791; G06K 9/00805; H04W 4/00; H04W 4/02; H04W 4/029; H04W 4/30; H04W 4/40
See application file for complete search history.

METHOD FOR OPERATING A MORE HIGHLY AUTOMATED VEHICLE (HAF), IN PARTICULAR A HIGHLY AUTOMATED VEHICLE

FIELD OF THE INVENTION

The present invention relates to a method for operating a more highly automated vehicle (HAF), in particular a highly automated vehicle, and to a driver assistance system for controlling a more highly automated vehicle (HAF), in particular a highly automated vehicle.

BACKGROUND INFORMATION

In view of an increase of the degree of automation of vehicles, more and more complex driver assistance systems are used. Such driver assistance systems and functions, such as e.g. highly automated driving or fully automated driving, require a great number of sensors in the vehicle, which allow for an exact detection of the vehicle surroundings.

More highly automated is understood below as all those degrees of automation that correspond, in the sense of the Bundesanstalt für Straßenwesen (BASt) [Federal Highway Research Institute], to an automated longitudinal and lateral guidance with increasing system responsibility, e.g. highly and fully automated driving.

The related art discloses a multitude of possibilities of implementing a method for operating a highly automated vehicle (HAF). In this context, in order to improve the localization of a highly automated vehicle (HAV) in a digital map, it is necessary to be able to guarantee the accuracy of the digital map, in doing so, the problem arising that short-term route changes caused, e.g., by construction sites, accidents or other circumstances, are not able to be considered or are considered only partially in digital maps, or occur at such short notice that a more highly automated vehicle (HAV), particularly a highly automated vehicle, cannot be provided with these short-term changes quickly enough, and must hand over the control of the vehicle to the driver. This may be undesirable and possibly even critical with respect to traffic safety.

In order to be able to control the vehicle in more highly automated fashion, which may be in all situations, it is necessary to have a digital map that is as free of errors as possible and corresponding to reality.

It is understood that it is possible to build up a representation of the vehicle surroundings, the so-called environment model, on the basis of various environment sensors such as for example radar sensors, cameras, driving dynamics sensors, GPS (global positioning system) and digital maps, it being possible to validate and possibly increase the up-to-dateness of a digital map by comparing the sensor data or the environment model with the digital map. If the environment model and the digital map show considerable deviations, it must be assumed that the map is not up to date and can henceforth only be used in a limited manner.

In this connection, however, it must be regarded as problematic that the resolution of common sensors is normally low at a distance and that the data are therefore encumbered with a more or less pronounced noise level that renders reliable evaluation difficult or even impossible. For this reason, in the related art, algorithms for position ascertainment on the basis of data from environment sensors concentrate primarily on the close range that is perceptible with greater reliability.

This represents a safety deficiency, however, precisely when driving at high speed, since a timely reaction to the often small route changes is only possible if sufficiently distant features of the surroundings are available for map validation. It is also possible to perform certain calculations based on the sensor data with greater precision if the features used as reference are as far away as possible, for example inferences as to the angles of rotation of the utilized sensor system in relation to the orientation of the digital map.

It is therefore an objective of the present invention to provide an improved method for operating a more highly automated vehicle (HAF), in particular a highly automated vehicle, and an improved driver assistance system for controlling a more highly automated vehicle (HAF), in particular a highly automated vehicle, which makes it possible to provide reliable information about the quality of sensor detections even in the long range, and which makes it possible to detect route changes with respect to a route status stored in a digital map, also called map errors, early and robustly, and which thus provides an improved validation of a digital map.

SUMMARY OF THE INVENTION

This objective may be achieved by the respective subject matter of the descriptions herein. Advantageous developments of the present invention are the subject matter of the respective further descriptions herein.

According to one aspect of the present invention, a method is provided for operating a more highly automated vehicle (HAF), in particular a highly automated vehicle, comprising the following steps:

S1 providing a digital map, which may be a highly accurate digital map, in a driver assistance system of the HAF;

S2 determining a current vehicle position and localizing the vehicle position in the digital map;

S3 providing at least one expected feature property of at least one feature in a surroundings of the HAF;

S4 detecting at least one actual feature property of a feature in the surroundings of the HAF at least partially on the basis of the expected feature property;

S5 comparing the actual feature property with the expected feature property and ascertaining at least one differential value;

S6 determining the plausibility of the actual feature property at least partially on the basis of the differential value.

The expected feature property of a feature is an item of a priori information, which is contained in the digital map for example. Examples of features are road markers, delineators, guardrails, traffic lights and traffic signs. The expected feature properties of these features may be the geographical position, dimensions, color or relative position of these features with respect to the HAF.

By specifying the features and feature properties, it is possible to limit at the outset the search area of the vehicle sensor system when detecting the features in the environment of the vehicle, which allows for a more robust discovery of the features in the surroundings of the HAF and thus the detection of the actual feature property of the features.

By comparing the expected feature property with the actual feature property, it is possible to ascertain a differential value corresponding to the agreement of the feature properties, which is a measure for the degree or the quality of the agreement. In the event of good agreement, the discovered actual feature property counts as a secured sensor detection, whereas the sensor detection is discarded as a false detection in the event of a lack of agreement. In this manner, the present invention provides secured information about the quality of sensor detections even in the long range, which was either not possible at all or not possible in a sufficient manner in the hitherto known methods.

The method of the present invention may include the step of a repeated determination of the current vehicle position at least partially on the basis of the actual feature property. Since the actual feature property is verified for plausibility following the comparison with the expected feature property, the determination of the current vehicle position may be carried out using the apparatus (arrangement) in driving environment sensor systems.

In another specific embodiment of the present invention, the method includes storing the at least one expected feature property of the at least one feature in the digital map, which may be a plurality of expected feature properties again of a plurality of features being stored in the digital map.

For the further procedure, one specific embodiment of the present invention advantageously provides for step S6 to include discarding an actual feature property as a false detection if the differential value exceeds a specified threshold value of a deviation. The threshold value of the deviation here depends for example on the nature of the detected feature property, for example on whether it is a road marker (short-term change is more probable, low error tolerance) or a traffic light (short-term change is rather improbable, higher error tolerance).

One advantageous specific embodiment of the present invention includes in step S3 providing a group of expected feature properties of a group of expected features, and includes in step S6 discarding an actual feature property of an individual feature from the group as a false detection if the differential values of the remaining features of the group exceed a specified threshold value of a deviation. This may be advantageous if for example the positions of a group of lane markers, for example road center markers, is specified as a group of expected feature properties. If merely the position of a single one of these road center markers is detected as the actual feature property and all others are not detected, then only a single differential value will yield an agreement of the expected and the actual feature property and all other differential values will not. Here it would then have to be assumed that even the detection of the one road center marker is a false detection.

Another subject matter of the present invention is a driver assistance system for controlling a more highly automated vehicle (HAF), in particular a highly automated vehicle, comprising
- at least one sensor for detecting an actual feature property of a feature in the surroundings of the HAF;
- a storage module (12) for storing a digital map, which may be a highly accurate digital map, the storage module being in particular a storage module integrated in the HAF or a central server; a position module (14) for determining a vehicle position of the HAF, the position module (14) may be a GPS module (global positioning system);
- a control unit (18), which is configured to exchange data with the storage module (12) and the position module (14) and to localize the vehicle position determined by the position module (14) in the digital map.

The driver assistance system according to the present invention is characterized in that the control unit is configured to implement a method as described herein.

In one specific embodiment of the present invention, the at least one sensor is selected from the group of the following sensors: acceleration sensors, camera sensors, radar sensors, lidar sensors.

Furthermore, a computer program, comprising program code for implementing the method as described herein, when the computer program is executed on a computer, is also a subject matter of the present invention.

Although the present invention is described below chiefly in connection with passenger cars, it is not limited to these, but may be used with any kind of vehicle, cargo trucks and/or passenger cars.

Additional features, possible applications and advantages of the present invention result from the following description of exemplary embodiments of the present invention, which are shown in the figures. It should be noted that the represented features only have a descriptive character and may also be used in combination with features of other developments described above and are not intended to limit the present invention in any form whatsoever.

The present invention is explained below in more detail with reference to an exemplary embodiment, the same reference symbols being used for identical features. The drawings are schematic.

DETAILED DESCRIPTION

Figure 1:
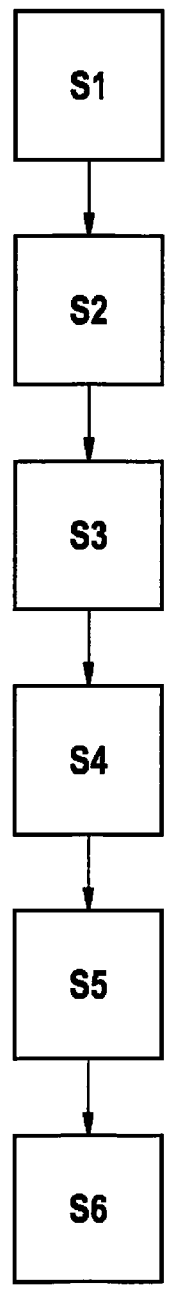
FIG. 1 shows a flow chart of a first specific embodiment of the method according to the present invention.

In step S1 of FIG. 1, a digital map, which may be a highly accurate digital map, is provided, which may be done on the device side in a storage module for storing the digital map, the storage module being in particular a storage module integrated into the HAF or a central server.

Step S2 includes the determination of a current vehicle position and localization of the vehicle position in the digital map, as is sufficiently known in the related art. On the device side, this occurs in accordance with the present invention by way of a position module, the position module may be a GPS module (global positioning system.

The step labeled S3 in FIG. 1 comprises the provision of at least one expected feature property of at least one feature in an surroundings of the HAF.

Figure 2:
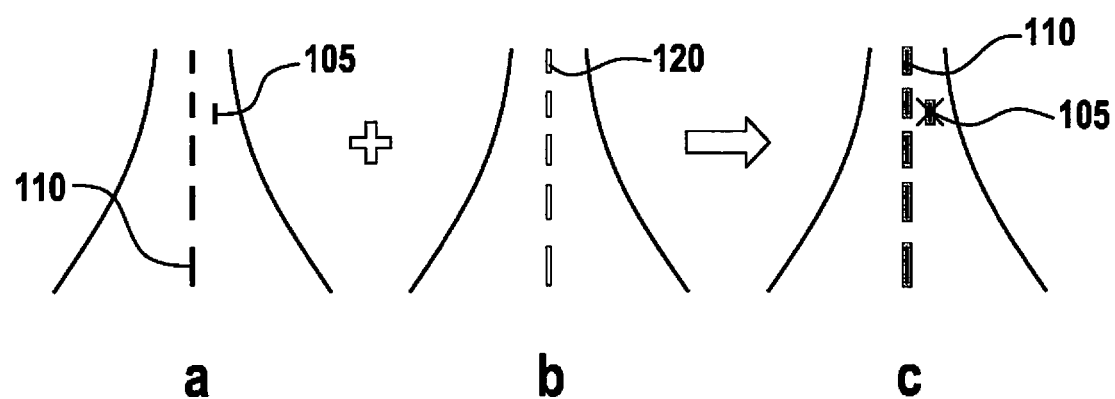
FIG. 2 shows a schematic illustration of the implementation of a second specific embodiment of the method according to the present invention.

As an example of this step, FIG. 2b shows the map information that a number of road center markers 120 are found in the surroundings of the HAF. Expected feature properties of these features, i.e., road center markers 120, are for example their geographical position, dimensions, color and their relative position with respect to the HAF, in this case the area in front of the vehicle.

FIG. 2a illustrates the method step of the present invention indicated in FIG. 1 by step S4, which comprises the detection of at least one actual feature property of a feature in the surroundings of the HAF at least partially on the basis of the expected feature property. At least one sensor is provided for this purpose for detecting the actual feature property of the feature in the surroundings of the HAF as well as a control unit, which is configured, among other things, to exchange data with the at least one sensor, with the storage module and the position module and to localize the vehicle position determined by the position module in the digital map. The sensor is selected from the group of the following sensors: acceleration sensors, camera sensors, radar sensors, lidar sensors.

It is advantageous in this regard that, due to the limitation of the search area by way of the expected feature properties, the sensor system provides fast results and functions in a robust manner.

FIG. 2a shows that the at least one sensor detects a series of road center markers 110 as well as a feature 105, which could in principle also be a road center marker, but which could also be a false detection. The associated uncertainty in view of the limited resolution capacity of the sensor system in the long range results in the problem common in the related art and described at the outset that conventional methods for map validation fundamentally do not take into account features in the long range or do so only to a very limited extent.

According to the present invention, a comparison is performed in step S5 between the actual feature properties of features 110 and the expected feature properties of features 120. As the result of the comparison, step S5 provides at least one differential value, which forms the basis of a plausibility check of the actual feature property in step S6.

As shown in FIG. 2c, for the properties of features 120, i.e., geographical position, dimensions, color and relative position with respect to the HAF, this comparison in the present case provides differential values that lie within a specified threshold value, which implies existing agreement. The sensor data of the actual feature properties of features 110 are thus plausible and may be used further.

By contrast, the comparison for the feature properties of feature 105 yields a differential value that exceeds a specified threshold value of a deviation, that is, no agreement. The sensor data of the actual feature properties of feature 105 are thus not plausible and the detection is discarded as a false detection.

Figure 3:
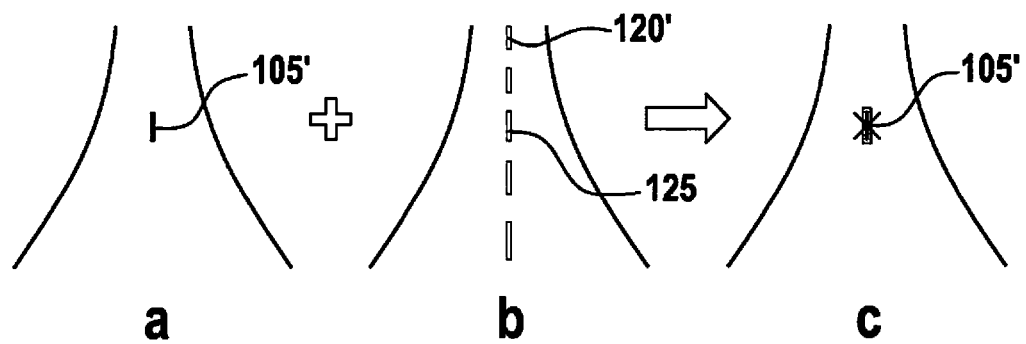
FIG. 3 shows a flow chart of a third specific embodiment of the method according to the present invention.

In a similar manner, it is possible to follow another specific embodiment of the present invention with reference to FIG. 3. Here, in step S3, again a group of expected feature properties of a group of expected features 120', again road center markers, is provided, which is shown in FIG. 3b. One of the road center markings is indicated by reference numeral 125.

FIG. 3b shows that the sensor data in step S4 indeed provide actual feature properties of the detected feature 105', whose differential values with respect to the expected sensor data of feature 125 could have the result that the detection of feature 105' is regarded as plausible, that is, as a road center marking. The specific embodiment of the present invention discussed here, however, provides for an actual feature property of an individual feature to be discarded from the group as a false detection if the differential values of the remaining features of the group exceed a specified threshold value of a deviation. This is the case in the example of FIG. 3 with respect to the remaining road center markings 120', which were not detected by the sensor. It is therefore not possible to detect an agreement between expected and actual feature properties. Accordingly, the detected feature 105 is also not detected as a road center marker, but is rather discarded as a false detection (see FIG. 3c).

The present invention is not limited to the exemplary embodiment shown. Rather, it also comprises all developments by those skilled in the art within the scope of the invention defined by the patent claims.

Besides the specific embodiments described and illustrated, additional specific embodiments are conceivable, which may include further modifications as well as combinations of features.

What is claimed is:

1. A method for operating an automated vehicle (HAF), the method comprising:

providing a digital map in a driver assistance system of the HAF;

determining a current position of the HAF and localizing the position of the HAF in the digital map;

providing at least one expected feature property of at least one feature in a surroundings of the HAF;

detecting at least one feature property of the at least one feature in the surroundings of the HAF at least partially based on the at least one expected feature property;

performing a feature matching operation between the at least one feature property and the at least one expected feature property by comparing the at least one feature property with the at least one expected feature property and ascertaining a feature differential value corresponding to a degree of deviation between the at least one feature property with the at least one expected feature property, and wherein when the ascertained feature differential value is the same as or below a feature differential threshold, storing the detected at least one feature property as an actual feature property, and wherein when the ascertained feature differential value exceeds the feature differential threshold, discarding the detected at least one feature property as a false detection; and determining a plausibility of the at least one feature property at least partially based on the ascertained feature differential value, wherein when the ascertained feature differential value exceeds the feature differential threshold, the at least one feature property is not plausible and a detected feature property is discarded as a false detection;

wherein the at least one feature includes road markers in the surroundings of the HAF, and wherein the at least one expected feature property includes at least one of a geographical position, dimensions, a color, and/or a relative position of the road markers with respect to the HAF, wherein the determining of the plausibility includes discarding a feature property as a false detection when the differential value exceeds the feature differential threshold, wherein in the providing of at least one expected feature property, a group of expected feature properties of a group of expected features is provided, and the determining of the plausibility includes discarding the detected at least one feature property as a false detection when the ascertained feature differential value is the same as or below the feature differential threshold when ascertained feature differential values of each of a group of detected features associated with the at least one feature property corresponding to degrees of deviation between each of the group of detected features associated with the at least one feature property exceed the feature differential threshold, and wherein the feature differential threshold depends upon the type of the detected feature property, including whether the detected feature is a road marker, or a traffic light, wherein the feature differential threshold corresponding to a detected road marker is lower than the feature differential threshold corresponding to a detected traffic light.

2. The method of claim 1, further comprising:
repeatedly determining the current position of the HAF at least partially based on the at least one feature property.

3. The method of claim 1, wherein the at least one feature further includes at least one of a delineator, a guardrail, a traffic light and/or a traffic sign.

4. The method of claim 1, wherein the at least one expected feature property and the at least one feature property respectively include at least one of the following properties:
the geographical position, the dimensions, the color, and/or the relative position of the road markers with respect to the HAF.

5. The method of claim 1, wherein the at least one expected feature property of the at least one feature is stored in the digital map, a plurality of expected feature properties of a plurality of features being stored in the digital map.

6. A driver assistance system for controlling an automated vehicle (HAF), comprising:
at least one sensor that detects at least one feature property of a feature in the surroundings of the HAF;
a storage module that stores a digital map, the storage module being integrated in the HAF or a central server;
a position module that determines a position of the HAF, the position module including a global positioning system (GPS) module; and
a control unit that exchanges data with the storage module and the position module and localizes the position of the HAF determined by the position module in the digital map;
wherein the control unit includes a non-transitory computer readable medium having a computer program, which is executable by a processor of the control unit, including a program code arrangement having program code operating an automated vehicle (HAF), by performing the following:
providing a digital map in a driver assistance system of the HAF;
determining a current position of the HAF and localizing the position of the HAF in the digital map;
providing at least one expected feature property of at least one feature in a surroundings of the HAF;
detecting at least one feature property of the at least one feature in the surroundings of the HAF at least partially based on the at least one expected feature property;
performing a feature matching operation between the at least one feature property and the at least one expected feature property by comparing the at least one feature property with the at least one expected feature property and ascertaining a feature differential value, based on the comparing, corresponding to a degree of deviation between the at least one feature property with the at least one expected feature property, and wherein when the ascertained feature differential value is the same as or below a feature differential threshold, storing the detected at least one feature property as an actual feature property, and wherein when the ascertained feature differential value exceeds the feature differential threshold, discarding the detected at least one feature property as a false detection; and
determining a plausibility of the at least one feature property at least partially based on the ascertained feature differential value, wherein when the ascertained feature differential value exceeds the feature differential threshold, the at least one feature property is not plausible and a detected feature property is discarded as a false detection;
wherein the at least one feature includes road markers in the surroundings of the HAF, and wherein the at least one expected feature property includes at least one of a geographical position, dimensions, a color, and/or a relative position of the road markers with respect to the HAF,
wherein the determining of the plausibility includes discarding a feature property as a false detection when the differential value exceeds the feature differential threshold,
wherein in the providing of at least one expected feature property, a group of expected feature properties of a group of expected features is provided, and the determining of the plausibility includes discarding the detected at least one feature property as a false detection when the ascertained feature differential value is the same as or below the feature differential threshold when ascertained feature differential values of each of a group of detected features associated with the at least one feature property corresponding to degrees of deviation between each of the group of detected features associated with the at least one feature property exceed the feature differential threshold, and
wherein the feature differential threshold depends upon the type of the detected feature property, including whether the detected feature is a road marker, or a traffic light, wherein the feature differential threshold corresponding to a detected road marker is lower than the feature differential threshold corresponding to a detected traffic light.

7. The driver assistance system of claim 6, wherein the at least one sensor includes at least one of an acceleration sensor, a camera sensor, a radar sensor, and/or a lidar sensor.

8. A non-transitory computer readable medium having a computer program, which is executable by a processor, comprising:
a program code arrangement having program code operating an automated vehicle (HAF), by performing the following:
providing a digital map in a driver assistance system of the HAF;
determining a current position of the HAF and localizing the position of the HAF in the digital map;
providing at least one expected feature property of at least one feature in a surroundings of the HAF;
detecting at least one feature property of at least one feature in surroundings of the HAF at least partially based on the at least one expected feature property;
performing a feature matching operation between the at least one feature property and the at least one expected feature property by comparing the at least one feature property with the at least one expected feature property and ascertaining a feature differential value, based on the comparing, corresponding to a degree of deviation between the at least one feature property with the at least one expected feature property, and wherein when the ascertained feature differential value is the same as or below a feature differential threshold, storing the detected at least one feature property as an actual feature property, and wherein when the ascertained feature differential value exceeds the feature differential threshold, discarding the detected at least one feature property as a false detection; and determining a plausibility of the at least one feature property at least partially based on the ascertained feature differential value, wherein when the ascertained feature differential value exceeds the feature differential threshold, the at least one feature property is not plausible and a detected feature property is discarded as a false detection;

wherein the at least one feature includes road markers in the surroundings of the HAF, and wherein the at least one expected feature property includes at least one of a geographical position, dimensions, a color, and/or a relative position of the road markers with respect to the HAF, wherein the determining of the plausibility includes discarding a feature property as a false detection when the differential value exceeds the feature differential threshold, wherein in the providing of at least one expected feature property, a group of expected feature properties of a group of expected features is provided, and the determining of the plausibility includes discarding the detected at least one feature property as a false detection when the ascertained feature differential value is the same as or below the feature differential threshold when ascertained feature differential values of each of a group of detected features associated with the at least one feature property corresponding to degrees of deviation between each of the group of detected features associated with the at least one feature property exceed the feature differential threshold, and wherein the feature differential threshold depends upon the type of the detected feature property, including whether the detected feature is a road marker, or a traffic light, wherein the feature differential threshold corresponding to a detected road marker is lower than the feature differential threshold corresponding to a detected traffic light.

\* \* \* \* \*